(12) United States Patent
Shimizu

(10) Patent No.: US 9,049,382 B2
(45) Date of Patent: Jun. 2, 2015

(54) IMAGE PROCESSING APPARATUS AND IMAGE PROCESSING METHOD

(71) Applicant: CANON KABUSHIKI KAISHA, Tokyo (JP)

(72) Inventor: Tomoyuki Shimizu, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 141 days.

(21) Appl. No.: 13/855,053

(22) Filed: Apr. 2, 2013

(65) Prior Publication Data

US 2013/0265465 A1  Oct. 10, 2013

(30) Foreign Application Priority Data

Apr. 5, 2012  (JP) ................................ 2012-086800

(51) Int. Cl.
| | |
|---|---|
| *H04N 5/262* | (2006.01) |
| *H04N 5/225* | (2006.01) |
| *H04N 5/232* | (2006.01) |
| *G06K 9/00* | (2006.01) |

(52) U.S. Cl.
CPC .......... *H04N 5/2621* (2013.01); *H04N 5/2258* (2013.01); *H04N 5/23212* (2013.01); *G06K 9/00255* (2013.01)

(58) Field of Classification Search
CPC  H04N 5/23212; H04N 5/2258; H04N 5/2621
See application file for complete search history.

(56) References Cited

U.S. PATENT DOCUMENTS

| | | | | |
|---|---|---|---|---|
| 6,611,289 | B1* | 8/2003 | Yu et al. | 348/265 |
| 8,675,098 | B2* | 3/2014 | Ohashi et al. | 348/239 |
| 8,754,958 | B2* | 6/2014 | Kim et al. | 348/223.1 |
| 2003/0020814 | A1* | 1/2003 | Ono | 348/220.1 |
| 2005/0001933 | A1* | 1/2005 | Yoshikawa et al. | 348/564 |
| 2005/0129324 | A1* | 6/2005 | Lemke | 382/254 |
| 2005/0244072 | A1* | 11/2005 | Imai | 382/254 |
| 2006/0192879 | A1* | 8/2006 | Hisamatsu | 348/333.01 |
| 2006/0210264 | A1* | 9/2006 | Saga | 396/287 |
| 2007/0058064 | A1* | 3/2007 | Hara et al. | 348/333.01 |
| 2007/0065134 | A1* | 3/2007 | Sugimoto | 396/165 |
| 2007/0065137 | A1* | 3/2007 | Hara et al. | 396/291 |
| 2007/0286589 | A1* | 12/2007 | Ishiwata et al. | 396/125 |
| 2008/0022230 | A1* | 1/2008 | Ogawa et al. | 715/838 |
| 2008/0218611 | A1* | 9/2008 | Parulski et al. | 348/262 |
| 2009/0073285 | A1* | 3/2009 | Terashima | 348/231.99 |
| 2009/0135269 | A1* | 5/2009 | Nozaki et al. | 348/222.1 |

(Continued)

OTHER PUBLICATIONS

Wilburn et al., "High Performance Imaging Using Large Camera Arrays", Proceedings of ACM SIGGRAPH 2005, pp. 765 to 776.

*Primary Examiner* — Michael Osinski

(74) *Attorney, Agent, or Firm* — Carter, DeLuca, Farrell & Schmidt, LLP

(57) ABSTRACT

There is a provided an image processing apparatus comprising an image generation unit to generate a processed image using an image group having a plurality of images captured from multiple view points, a first image recognition unit to recognize a particular object from the processed image, a second image recognition unit to recognize respective objects which appear in the image group, a determination unit to compare the results by the first and second image recognition units and to determine an object of interest and an object of noninterest, and an attribute generation unit to generate attribute information including the result of determination by the determination unit, in the processed image.

12 Claims, 8 Drawing Sheets

(56) References Cited

U.S. PATENT DOCUMENTS

| | | | |
|---|---|---|---|
| 2009/0309700 A1* | 12/2009 | Fujita | 340/5.82 |
| 2010/0103192 A1* | 4/2010 | Fukumoto et al. | 345/620 |
| 2011/0058028 A1* | 3/2011 | Sakai | 348/77 |
| 2011/0103644 A1* | 5/2011 | Garten | 382/103 |
| 2011/0134261 A1* | 6/2011 | Sharma | 348/222.1 |
| 2012/0206619 A1* | 8/2012 | Nitta et al. | 348/222.1 |
| 2012/0281886 A1* | 11/2012 | He et al. | 382/118 |
| 2012/0300115 A1* | 11/2012 | Okada | 348/348 |
| 2012/0307093 A1* | 12/2012 | Miyoshi | 348/218.1 |
| 2013/0163814 A1* | 6/2013 | Takiguchi | 382/103 |
| 2013/0208984 A1* | 8/2013 | Mase | 382/190 |
| 2013/0251198 A1* | 9/2013 | Shimizu | 382/103 |
| 2013/0329124 A1* | 12/2013 | Nagamatsu | 348/349 |
| 2014/0267833 A1* | 9/2014 | Chen et al. | 348/239 |

* cited by examiner

F I G. 3
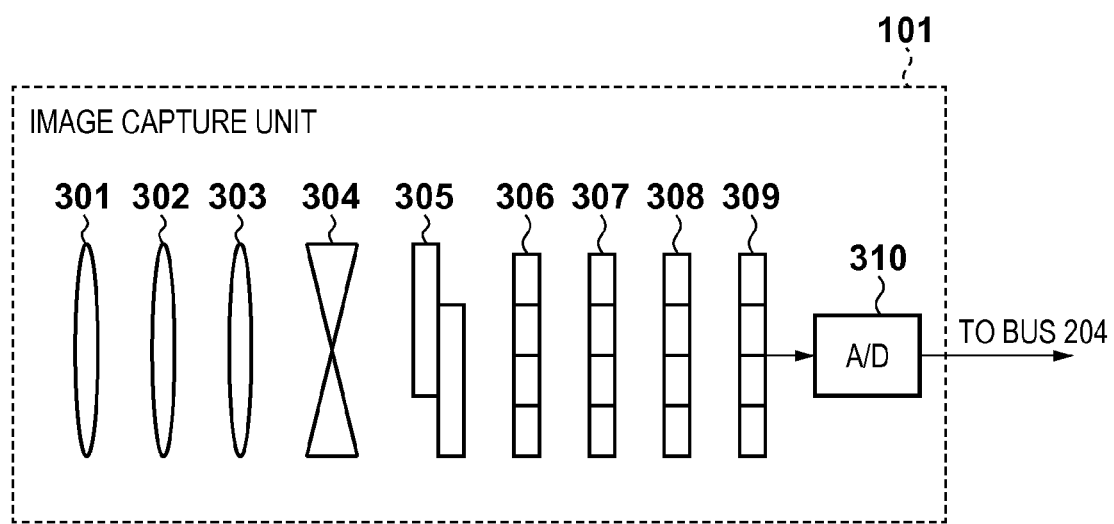

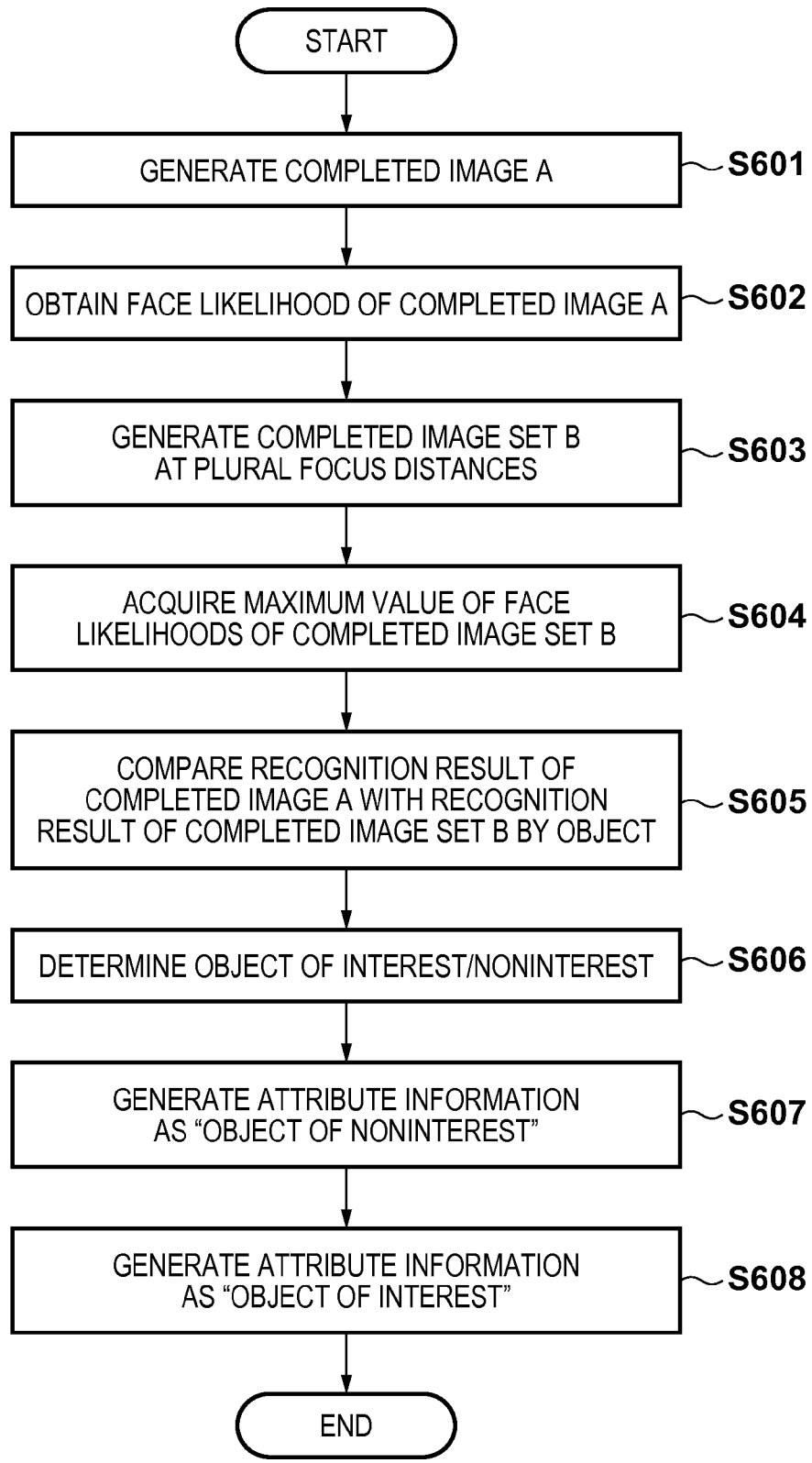

FIG. 8

| OBJECT | MAXIMUM FACE LIKELIHOOD |
|---|---|
| A | 0.88 |
| B | 0.9 |
| C | 0.84 |
| D | 0.91 |

FIG. 10

| OBJECT | FACE LIKELIHOOD |
|---|---|
| A | 0.64 |
| B | 0.93 |
| D | 0.89 |

FIG. 11

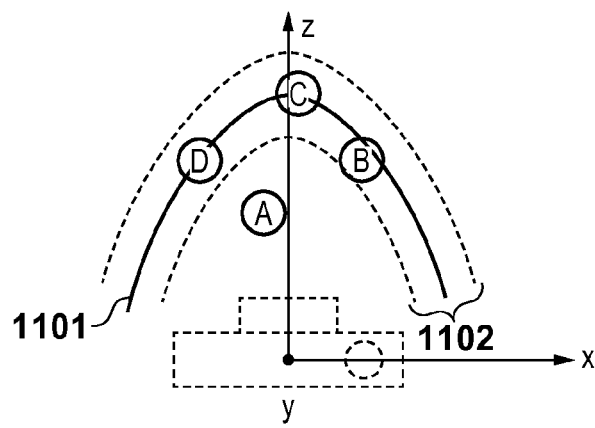

FIG. 12

```
<IMAGE>
  <DISCRIMINATION ID>XXX</DISCRIMINATION ID>
  <IMAGE GROUP ID>YYY</IMAGE GROUP ID>
  ...
  <OBJECT>
    <TYPE>PERSON</TYPE>
    <DISCRIMINATION ID>001</DISCRIMINATION ID>
    <NAME>A</NAME>
    <is OF INTEREST>0</is OF INTEREST>(=NO)
    ...
  </OBJECT>
  <OBJECT>
    <TYPE>PERSON</TYPE>
    <DISCRIMINATION ID>002</DISCRIMINATION ID>
    <NAME>B</NAME>
    <is OF INTEREST>1</is OF INTEREST>(=YES)
    ...
  </OBJECT>
  ...
</IMAGE>
```

IMAGE PROCESSING APPARATUS AND IMAGE PROCESSING METHOD

BACKGROUND OF THE INVENTION

1. Field of the Invention

The present invention relates to an image processing apparatus and an image processing method especially preferably applicable upon generation of an image on image capture conditions changed based on images captured from multiple view points.

2. Description of the Related Art

Conventionally, a method of generating an image, based on images acquired by capturing an object from multiple view points, with arbitrary focal distance, depth of field and view point, is known.

For example, Bennett Wilburn, Neel Joshi, Vaibhav Vaish, Eino-Ville Talvala, Emilio Antunez, Adam Barth, Andrew Adams, Marc Levoy and Mark Horowitz, disclose in "High Performance Imaging Using Large Camera Arrays", the United States, Proceedings of ACM SIGGRAPH 2005, pages 765 to 776, a technique of acquiring plural images from different view points (hereinbelow, such multiple view points images will be referred to as an "image group") with plural cameras arranged in a grid pattern on a two-dimensional plane. Further, according to this technique, focus adjustment is performed by providing a view point, a focal distance and an aperture diameter as parameters, and an image (hereinbelow, an image generated with adjusted focus based on given parameters will be referred to as a "completed image") is generated from these image group by computation processing. Accordingly, it is possible to generate various completed images in accordance with parameter settings by a user.

SUMMARY OF THE INVENTION

The present invention has been made in view of the above-described problems. This disclosure provides a technique of generating information reflecting a user's intention of image capture upon generation of a processed image with adjusted focus from an image group captured from multiple view points.

According to an aspect of this disclosure there is provided an image processing apparatus comprising: an image generation unit to generate a processed image in which image capture-related parameters are adjusted, using an image group having a plurality of images captured from multiple view points; a first image recognition unit to recognize a particular object from the processed image generated by the image generation unit; a second image recognition unit to recognize respective objects which appear in the image group, based on the image group; a determination unit to compare the result of recognition by the first image recognition unit to the result of recognition by the second image recognition unit, and determine an object of interest and an object of noninterest in the image group; and an attribute generation unit to generate attribute information including the result of determination by the determination unit, in the processed image.

According to the present invention, it is possible to generate information reflecting a user's intention of image capture, and it is possible to generate another processed image using the information, and further it is possible to use the information upon image search.

Further features of the present invention will become apparent from the following description of exemplary embodiments (with reference to the attached drawings).

BRIEF DESCRIPTION OF THE DRAWINGS

FIG. 3 is a schematic diagram showing an example of an internal configuration of the image capture unit according to the embodiment;

FIG. 6 is a flowchart showing an example of a process procedure for generating attribute information of a completed image with the image processing apparatus according to the embodiment;

FIG. 8 is a table showing an example of maximum recognition likelihood by object;

FIG. 10 is a table showing an example of recognition likelihood by object;

FIG. 11 is an explanatory diagram showing another example of the relation between the object position and the focal distance; and FIG. 12 is an example of the attribute information of a completed image generated in the embodiment.

DESCRIPTION OF THE EMBODIMENTS

Hereinbelow, preferred embodiments of the present invention will be described in detail in accordance with the accompanying drawings.

Figure 1:
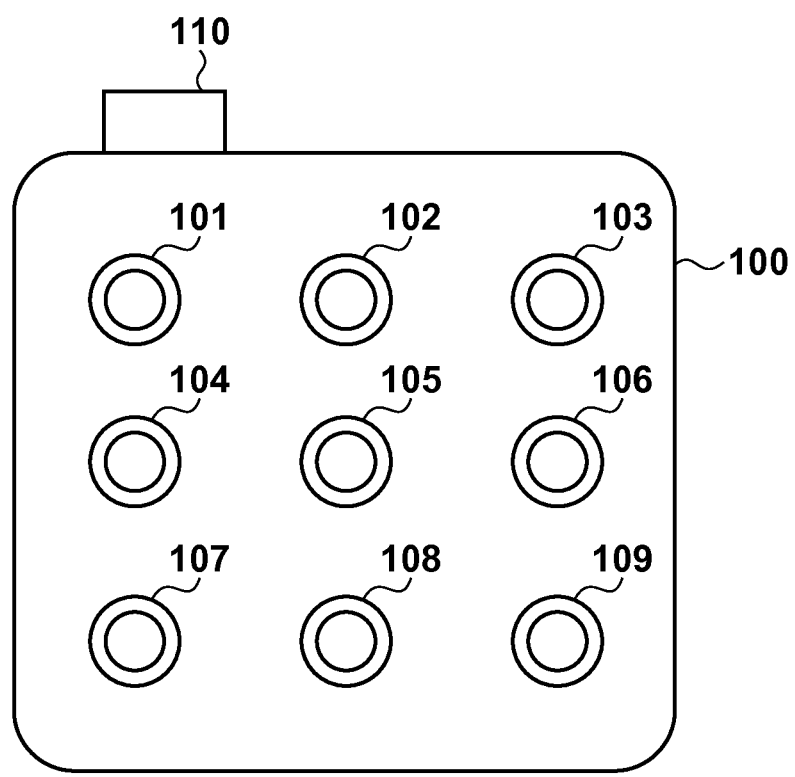
FIG. 1 schematically illustrates an example of a multiple-viewpoint type image capture apparatus having plural image capture units according to an embodiment of the present invention.

FIG. 1 schematically illustrates an example of a multi-view image capture apparatus 100 having plural image capture units according to an embodiment of the present invention.

In FIG. 1, the image capture apparatus 100 has nine image capture units 101 to 109 to acquire color images and an image capture button 110. These nine image capture units 101 to 109 are uniformly arrayed in a square grid. When a user presses an image capture button 110, the image capture units 101 to 109 receive optical information of an object with sensors (image capture devices), and acquire plural (nine) color images (digital data). Using the multi-view image capture apparatus 100 having this arrangement, it is possible to acquire nine color images by capturing the same object from plural (nine) view point positions. Hereinafter, the nine images will be referred to as an "image group".

Note that in the present embodiment, the number of image capture units is nine, however, the number of image capture units is not limited to nine. The present invention is applicable as long as the image capture apparatus has plural image capture units. Further, in the present embodiment, the nine image capture units are uniformly arrayed on the square grid, however, the image capture units can be arbitrarily arranged. For example, the image capture units may be radially or linearly arranged or may be arranged at random.

Figure 2:
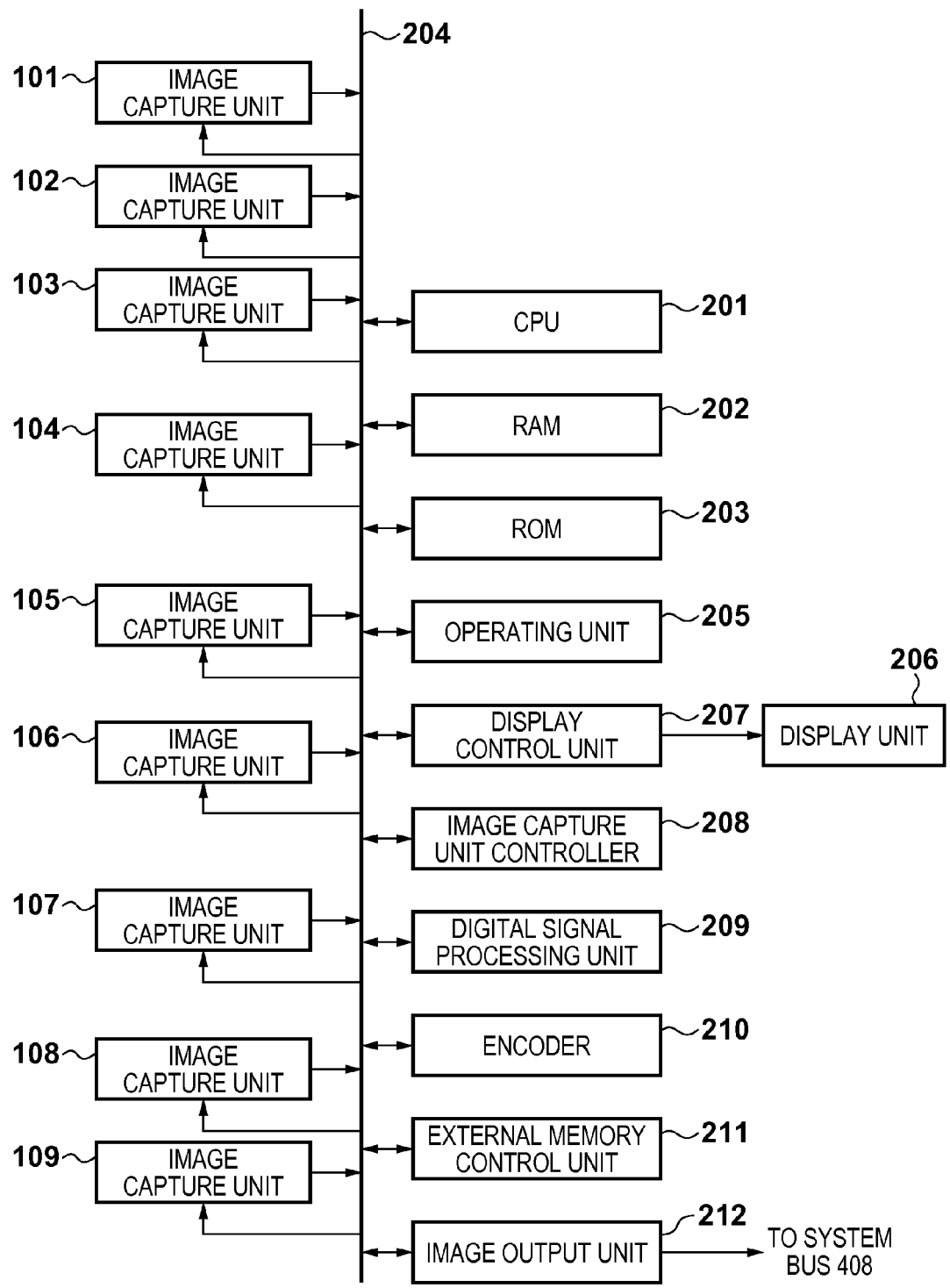
FIG. 2 is a block diagram showing an example of an internal configuration of the image capture apparatus according to the embodiment.

FIG. 2 is a block diagram showing [an example of] an internal configuration of the image capture apparatus according to the embodiment.

In FIG. 2, a central processing unit (CPU) 201 of the image capture apparatus 100 controls respective units described below. A RAM (Random Access Memory) 202 functions as a main memory of the CPU 201, a work area and the like. A ROM (Read Only Memory) 203 holds a control program executed by the CPU 201, and the like.

A bus 204 is used as a transfer path to transfer various data in the image capture apparatus 100. For example, the digital data acquired with the image capture units 101 to 109 is sent via the bus 204 to a predetermined processing unit. An operating unit 205 is used by a user to input an instruction into the image capture apparatus 100. The operating unit 205 has various buttons (including the image capture button 110) a mode dial and the like. A display 206 is used as a display unit on which the image capture apparatus 100 displays captured images and characters. For example, a liquid crystal display is employed as the display 206. Further, the display 206 may be provided with a touch screen function. In this case, it is possible to handle an instruction using the touch screen as an input from the operating unit 205. A display control unit 207 controls display of the captured images and characters on the display 206.

An image capture unit controller 208 performs control on an image capture system for focusing, shutter opening/closing, aperture control and the like based on an instruction from the CPU 201. A digital signal processing unit 209 performs various processings such as white balance processing, gamma processing and noise reduction processing on the digital data received via the bus 204. An encoder 210 performs processing to convert the digital data in file format such as JPEG or MPEG.

An external memory control unit 211 is an interface for connection to an external device and other media (e.g., a hard disk, a memory card, an SD card and a USB memory). An image output unit 212 outputs the color image group acquired with the image capture units 101 to 109 or the color image group outputted from the digital signal processing unit 209, as an image group obtained by capturing the same object in a distinguishable status. Note that the image capture apparatus 100 has other constituent elements than those described above. However, as such elements are not primary elements, explanations thereof will be omitted.

FIG. 3 is a schematic diagram showing [an example of] an internal configuration of the image capture unit 101. Note that the image capture units 102 to 109 have the same configuration.

The image capture unit 101 has a zoom lens 301, a focus lens 302, a blur correction lens 303, an aperture 304, a shutter 305, an optical low-pass filter 306, an iR cut filter 307, a color filter 308, a sensor 309 and an A/D converter 310.

The sensor 309 is e.g. a CMOS image sensor or a CCD image sensor. When the sensor 309 detects a light quantity of an object, the A/D converter 310 converts the detected light quantity into a digital value, and outputs the digital data to the bus 204.

Next, the circuitry of an image processing apparatus according to the present embodiment will be described with reference to the block diagram of FIG. 4.

In the present embodiment, the configuration of the image processing apparatus 400 may be realized with a single apparatus, or may be realized with plural devices having respective functions in accordance with necessity. When the image processing apparatus has plural devices, the devices are interconnected for mutual communication via a Local Area Network (LAN). Further, in the present embodiment, the image capture apparatus 100 and the image processing apparatus 400 are mutually connected, and the image group outputted from the image output unit 212 is stored via a system bus 408 into an external storage device 404.

Figure 4:
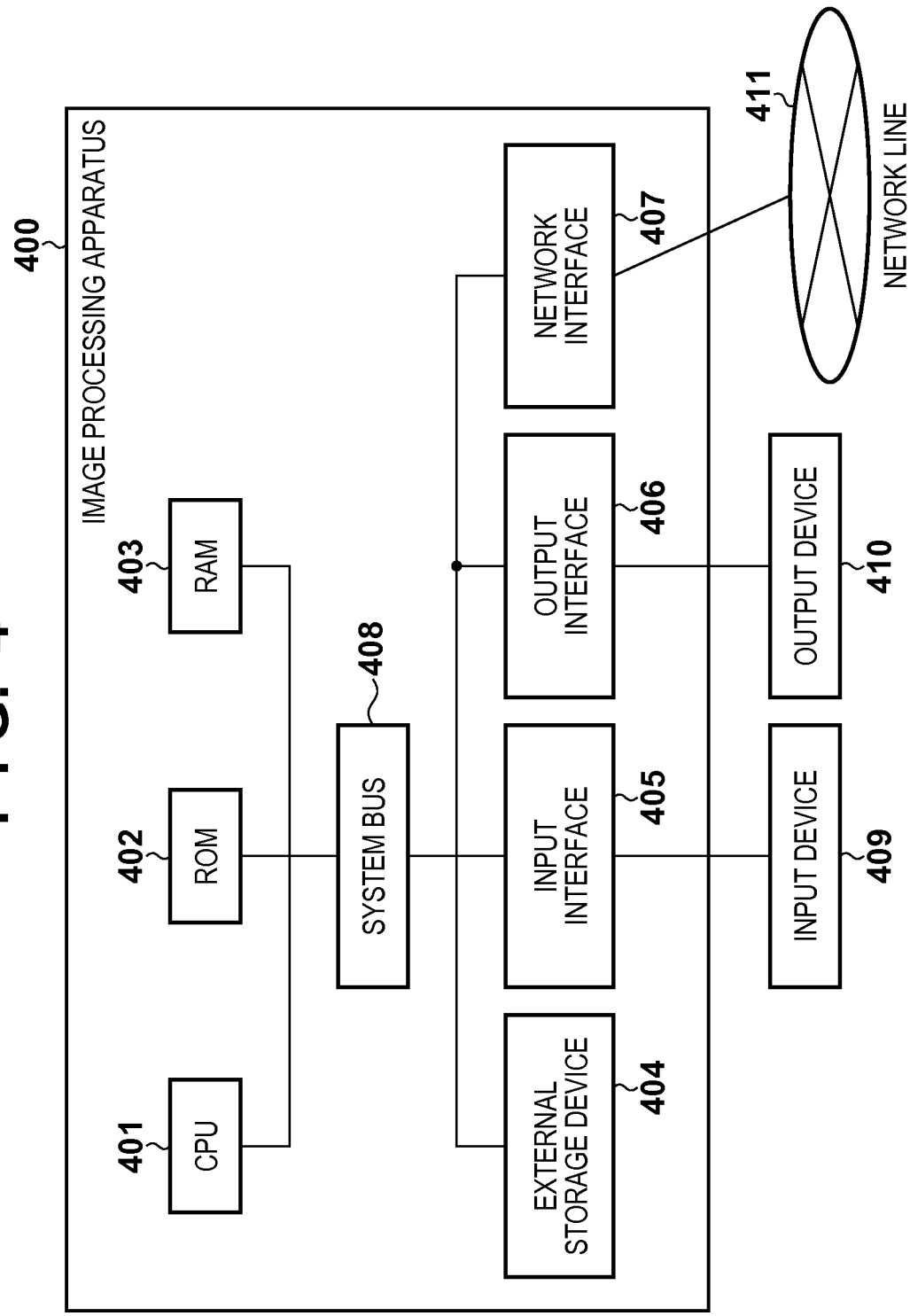
FIG. 4 is a block diagram showing an example of a circuitry of an image processing apparatus according to the embodiment.

In FIG. 4, a CPU 401 controls the entire image processing apparatus 400. A ROM 402 holds programs and parameters which are not varied. A RAM 403 temporarily holds programs and data supplied from an external device or the like. The external storage device 404 includes a hard disk drive (HDD) or a memory drive (SSD) fixedly installed in the image processing apparatus 400, or an optical disk, a memory card and the like attachable/removable to/from the image processing apparatus 400.

An input interface 405 is an interface between the image processing apparatus and an input device 409 such as a pointing device, a keyboard and a touch panel to input data in response to the user's operation. An output interface 406 is an interface between the image processing apparatus and an output device 410 such as a monitor, to which data held in the image processing apparatus 400, supplied data, the result of execution of a program and the like are outputted. A network interface 407 is an interface for connection to a network line 411 such as the Internet.

The system bus 408 is used as a transfer path for transfer of various data in the image processing apparatus 400. For example, when the image group outputted from the image output unit 212 of the image capture apparatus 100 is inputted into the external storage device 404 of the image processing apparatus 400 via the external memory control unit 211, the image group is passed through the system bus 408. Further, when the respective units process the image group, the image group is passed through the system bus 408.

Figure 5:
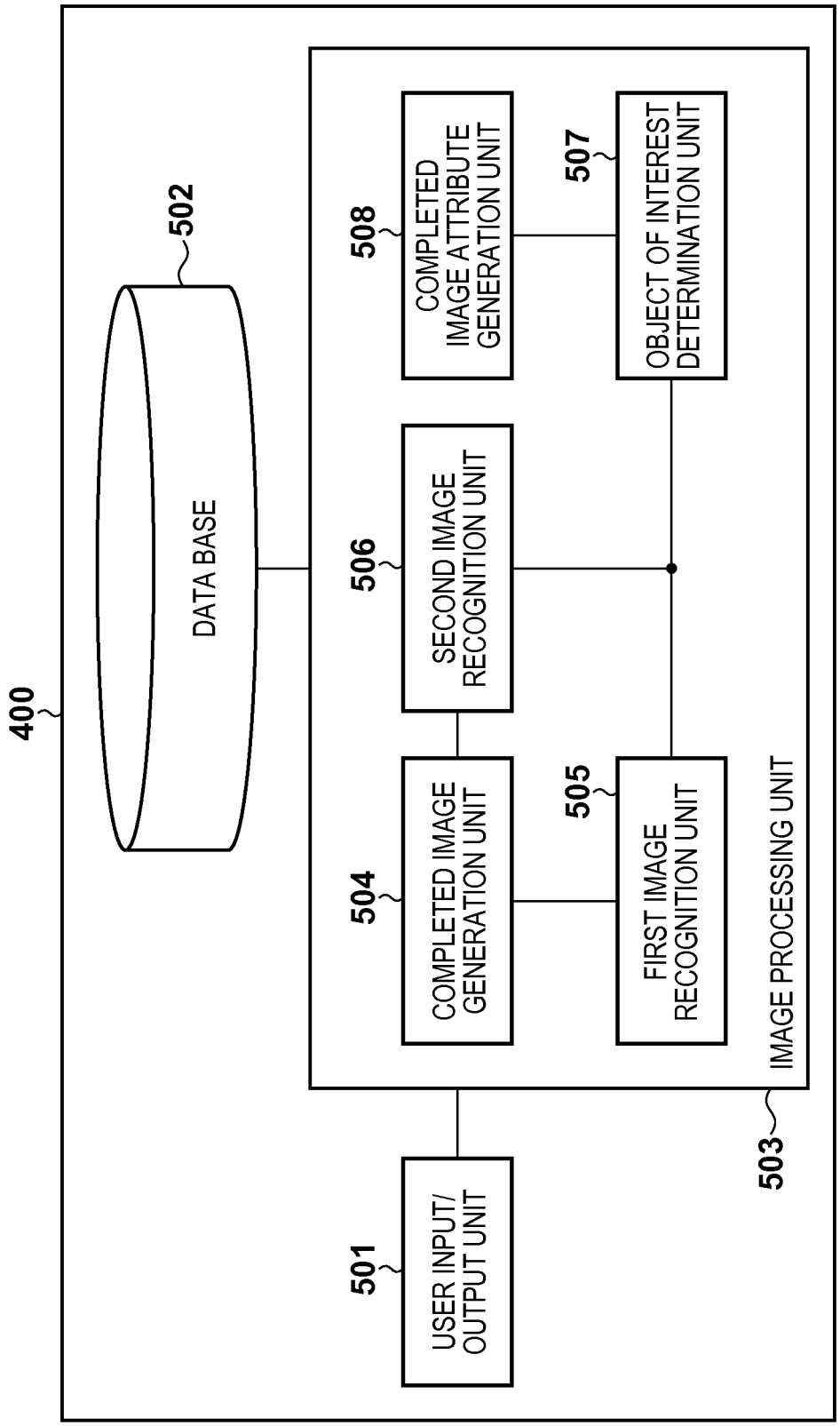
FIG. 5 is a block diagram showing an example of a functional configuration of the image processing apparatus according to the embodiment.

Next, the functional configuration of the image processing apparatus 400 according to the present embodiment will be described with reference to the block diagram of FIG. 5. In the figure, the respective processing units function by execution of the programs stored in the ROM 402 and the RAM 403 with the CPU 401, however, the processing units may be realized, not with programs, but with corresponding circuits.

The image processing apparatus 400 according to the present embodiment has an image processing unit 503, a user input/output unit 501, and a data base 502 to hold various information. The image processing apparatus 400 uses information registered and stored in a general image management system.

The user input/output unit 501 performs input/output such as image registration by the user and information display conducted via the input interface 405 or the output interface 406. In the present embodiment, an interface is provided to at least realize the user's operation to generate a completed image (processed image). For example, when a complete image is generated with a completed image generation unit 504 to be described later using parameters in initial settings, the user input/output unit 501 presents its preview image to the user. The user can conduct an operation to perform view point designation and depth adjustment with respect to the preview image. The image processing apparatus 400 updates the parameters and re-generates the image in response to the user's operation, thus updates the preview. With repetition of these processings, the user can generate a completed image envisioned by the user while watching the preview image. Note that it may be arranged such that the user inputs parameter values such as a view point position, a focal distance and an aperture opening value and generates a completed image.

The data base 502 holds at least data of registered image groups, completed images and the like, and attribute information related to the respective completed images. The data base 502 is held and managed in the RAM 403 and the external storage device 404. Further, attribute information of a completed image outputted from a completed-image attribute generation unit 508 to be described later, linked to its completed image, is managed in the data base 502.

The image processing unit 503 performs control to process the various information managed in the image processing apparatus 400 with the respective units described below.

The completed image generation unit 504 receives parameters such as a view point position in an image, a focal distance, an aperture opening value and the like, processes an image group as the subject of processing in accordance with the parameters, and generates one completed image. In the present embodiment, the completed image generation unit 504 generates a completed image in correspondence with the user's operation as described above.

A first image recognition unit 505 inputs a completed image, performs face-detection processing on an object and the like included in the completed image, and outputs the image and face likelihood information. When the object or the like is detected as a face, likelihood of human face is calculated as face likelihood. The face likelihood is not likelihood to identify an individual person. In the present embodiment, recognition processing to identify a person utilizing face recognition is further performed. In the processing, a face feature of a person to be identified is learned in advance, and a part of an image having a feature similar to the face feature is identified as the person. For this purpose, to discriminate an individual person, feature data of plural persons are stored in a data base 502 in advance as a face discrimination dictionary. Then face recognition to recognize a person is performed with respect to the face-detected region with reference to the face discrimination dictionary. Note that when the face likelihood is low, as the region is noise or an unknown person, the region is filtered with a predetermined threshold value, and not included in the recognition result.

A second image recognition unit 506 exhaustively recognizes respective objects included in the image group (nine images in the embodiment) as the subject of processing/to be processed. In the present embodiment, first, parameters are set with respect to the image group while a focal distance is increased at a previously-set arbitrary interval. Then, in accordance with the set parameters, the completed image generation unit 504 generates a completed image group for comparison in accordance with the example shown in FIG. 7. The second image recognition unit 506 performs the face detection and recognition in the completed image group.

An object of interest determination unit 507 determines whether or not each of the objects subjected to the face recognition with the second image recognition unit 506 is an object of interest set by the user in the completed image generated in accordance with the user's instruction. More particularly, the determination is made by comparing the face likelihood in the completed image generated in accordance with the user's operation and a maximum face likelihood obtained by the setting with the second image recognition unit 506, by object. When the difference is out of the range of a predetermined threshold value, it is determined that the object is set not to be an object of interest in the completed image. On the other hand, when the difference is within the range of the predetermined threshold value, or the face likelihood is higher than the maximum face likelihood, it is determined that the object is an object of interest.

The completed-image attribute generation unit 508 generates attribute information of the completed image generated in accordance with the user's operation from the result of determination with the object of interest determination unit 507. In the present embodiment, the completed-image attribute generation unit 508 generates attribute information including at least object information in the completed image, and information as to whether or not each object is an object of interest in the completed image.

In this manner, when images are acquired from multiple view points and a completed image is acquired using the image group, an object of interest and an object not to be handled as an object of interest are determined after image capturing, then, the focal distance and depth are set in accordance with the objects and focus adjustment is performed with the set focal distance and depth. Accordingly, the completed image includes information corresponding to the conventional image capture intension which has not been fully utilized with the conventional techniques. The completed-image attribute generation unit 508 generates the attribute information of the completed image using the information corresponding to the image capture intention.

Next, a procedure of processing in the image processing apparatus 400 according to the preset embodiment will be described with reference to the flowchart of FIG. 6.

First, at step S601, the completed image generation unit 504 generates a completed image in accordance with the user's operation via the user input/output unit 501. Hereinbelow, the completed image generated with this processing will be referred to as a completed image A.

Figure 9:
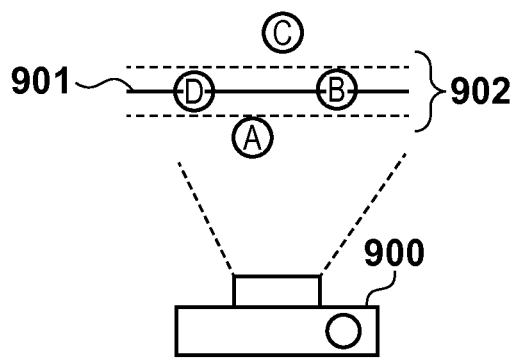
FIG. 9 is an explanatory diagram showing the relation between object positions and the focal distance.

FIG. 9 is an explanatory diagram showing the positional relation between the image capture apparatus 100 and objects.

In FIG. 9, alphabets A, B, C and D are objects on which image capturing is performed with an image capture apparatus 900 so as to acquire multiple-viewpoint images. In this case, the focal distance is set to a line 901 where the objects B and D exist, and the parameter of opening diameter is adjusted, such that a completed image A where the objects B and D are included in the depth 902 is generated.

Next, at step S602, the first image recognition unit 505 detects and recognizes the objects of the completed image A, and calculates face likelihood. At this time, the first image recognition unit 505 links each object to the face likelihood and outputs the information. For example, regarding a completed image acquired with the settings as shown in FIG. 9, the result of detection and recognition as shown in FIG. 10 is obtained. The face likelihood is obtained as the result of face detection, and an individual object is discriminated by recognition of the detected face. In this example, in addition to the objects B and D in focus, the object A having likelihood greater than a threshold value is detected, accordingly, the face likelihood of the object A is outputted. On the other hand, as the face likelihood of the object C is less than the threshold value, it is not included in the recognition result.

Next, at step S603, the second image recognition unit 506 obtains the image group (nine images) as bases of generation of the completed image A from the data base 50. Then, the completed image generation unit 504 generates, while increasing the focal distance parameter at a predetermined interval, plural completed images in correspondence with the focal distance. Then the second image recognition unit 506 detects and recognizes objects appear in these plural completed images. Hereinbelow, the set of these completed images will be referred to as a completed image set B.

Figure 7A:
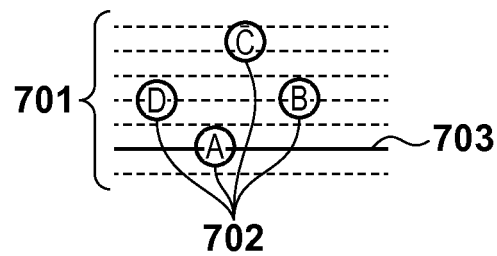
FIGS. 7A to 7C are explanatory diagrams showing the relation between an object position and a focal distance.
Figure 7B:
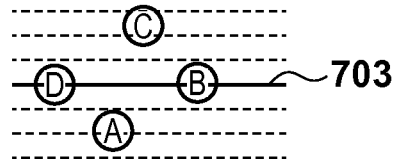
Figure 7C:
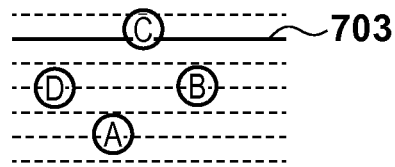

Further, FIGS. 7A to 7C are explanatory diagrams showing setting of the focal distance in a range 701 when completed images are generated while the focal distance is gradually increased along an object 702. In a focal distance 703 shown in FIG. 7A, a completed image where at least the object A is in focus is obtained. Similarly, in the focal distance 703 shown in FIG. 7B, a completed image where the objects B and D are in focus is obtained. In the focal distance 703 shown in FIG. 7C, a completed image where the object C is in focus is obtained. These focal distances are set with the second image recognition unit 506. Since it makes it possible to estimate the focal distances for example by using parallax information, the obtained focal distances for each pixel can be held. Accordingly, it is possible to efficiently obtain a completed image where an object is in focus by adjusting the focal distance using focal distance distribution.

Next, at step S604, the second image recognition unit 506 detects and recognizes the objects in the respective images in the completed image set B, and calculates the maximum value of face likelihood (maximum face likelihood). At this time, the second image recognition unit 506 links the respective objects to their maximum values of face likelihood and outputs the information. For example, the second image recognition unit 506 performs object detection and recognition with respect to the respective completed images obtained in the pattern as shown in FIG. 7. The the second image recognition unit 506 generates a list of identified objects detected with likelihood higher than a predetermined value. At this time, when the recognized objects are overlapped each other in the respective completed images, the maximum face likelihood values of the respective objects are recorded.

As described above, in the example shown in FIGS. 7A to 7C, a list of objects and their maximum face likelihood values as shown in FIG. 8 is generated. In the present embodiment, as completed images where the respective objects are in focus are acquired, all the objects A to D are exhaustively recognized and the maximum face likelihood values are respectively high.

Next, at step S605, the object of interest determination unit 507 receives the output results at steps S602 and S604, and performs linking by object. Then at step S606, the object of interest determination unit 507 analyses the result of linking at step S605 to determine an object of interest and an object set not to be an object of interest (hereinbelow, object of noninterest). More particularly, regarding an object, when the face likelihood of the completed image A is greatly lower than a threshold value with a predetermined reduction width in comparison with the maximum face likelihood of the completed image set B, it is determined that a change to reduce the detection accuracy has occurred. Then the object is determined as an "object of noninterest". Further, when an object detected and recognized in the completed image set B does not appear as a result of detection and recognition in the completed image A, the object is determined as an "object of noninterest" for a similar reason.

For example, assuming that the list shown in FIG. 10 is obtained as a result of detection and recognition of a completed image generated in accordance with the user's operation, and the list shown in FIG. 8 is obtained as a result of detection and recognition in the image with a full focal distance, the face likelihood of the object A in the completed image is lower in comparison with the maximum face likelihood in the entire recognition. When a threshold value with a reduction width is set to 0.2, as the face likelihood of the object A is reduced to be lower than the threshold value, the object A is determined as an object not to be an object of interest. Further, regarding the object C, it is included as a result of the entire recognition, however, it is not included as a result of recognition in the completed image. Accordingly, the object C is also determined as an object not to be an object of interest. On the other hand, the face likelihood of the object B and that of the object D are not greatly different, or the object have high values with respect to the maximum face likelihood obtained as a result of entire recognition. Accordingly, the objects B and D are determined as objects of interest.

Next, at step S607, the completed-image attribute generation unit 508 generates attribute information indicating that the object determined at step S606 as an "object of noninterest" is an object not to be an object of interest in the completed image A. At this time, the data format of the attribute information generated with the completed-image attribute generation unit 508 is desirably a format to handle structural information as described above, and is not particularly limited as long as it is a data format to represent the structure. In the present embodiment, the attribute information is generated in the structural-information describable XML format.

Next, at step S608, the completed-image attribute generation unit 508 generates attribute information, with the object recognized in the completed image A and not determined at step S606 as an "object of noninterest", as an object of interest in the completed image A.

In the present embodiment, at steps S607 and S608, as the result of determination, attribute information as shown in FIG. 12 is generated. As shown in FIG. 12, first, as attribute of an image itself, information such as <discrimination ID> and <image group ID> to specify an image group as a base of generation of the completed image are described. Further, as the attribute information, <object> attribute (the part "<object> to </object>") is described by the number of objects. The number of objects is the number of objects recognized with the second image recognition unit 506. Regarding the respective objects, information as to whether or not it is an object of interest, is described in the above attribute.

Further, in the example of FIG. 12, <is of interest> attribute is represented with "0" (=of noninterest) or "1" (of interest). For example, regarding the object having "A" as <name>, as <is of interest> attribute is "0", it is an object of noninterest. Regarding the object having "B" as the <name>, as the <is of interest> attribute is "1", it is an object of interest. Note that the description in FIG. 12 is an example, and the attribute name and the description format are not limited to this description as long as description of this sort is possible. Further, attribute which is not described may be included, or a deeper hierarchical structure may be formed as more detailed attribute information.

As described above, according to the present embodiment, it is possible to generate attribute information indicating the user's interest/uninterest, which are not obtained merely with recognition processing on a completed image, with respect to the respective objects in the completed image. The attribute information is obtained by utilizing a feature to specify an object totally included in image capture operation to generate multiple-viewpoint images to grasp how the entire object has changed upon generation of the completed image.

It is possible to use a completed image as follows by utilizing such attribute information. Assuming a completed image where a grandchild is in focus and the background is blurred is generated, when the grandparents exist in the background, attribute information indicating that "the grand child is of interest, but the grandparents are of noninterest" is obtained. Accordingly, with the attribute information as a retrieval key, it is possible to search for a completed image where the grandparents appear with their grandchild but actually the grandchild is in focus.

Further, when an image to be displayed is selected with a key as described above by a processing program to automatically generate a slide show or the like, it is possible to generate an image which corresponds to viewer(s). For example, when the grandparents are the viewers, an image where the grandchild is an object of interest but the grandparents are objects of noninterest is selected. Further, the parents are the viewers, an image where the parents are objects of noninterest is selected. Thus it is possible to perform image selection in correspondence with purpose.

(Other Embodiments)

In the above-described embodiment, in the recognition processing with the first image recognition unit 505 and the second image recognition unit 506, a person is identified with a face image, however, the identification is not limited to this arrangement. Even when an object is a pet or an object, the present invention is not substantially changed, but the same processing is performed. For example, when it is possible to recognize a land mark building, a famous object and the like while travelling, the addition of interest/noninterest attribute information to the respective objects is not different from that in the case of persons.

Further, it may be arranged such that a person is not identified but a face is simply recognized. In this case, it is possible to recognize the region of an object and the existence of the person. For example, a large number of objects can be face-recognized with the second image recognition unit 506, however, in a completed image, the number of face-recognizable objects is reduced. In this case, attribute information indicating that "many objects exist, and they are humans and of noninterest" is generated with respect to the completed image. It is understood from this attribute information that many people exist in the background and the other object(s) is of interest.

Further, in the above-described embodiment, the completed image generation unit 504 generates a completed image in focus with an equivalent focal distance, however, the present invention is not limited to this arrangement. For example, a conventional technique of focus adjustment along a curved surface may be utilized. For example, as shown in FIG. 11, it may be arranged such that a virtual focus surface 1101 having a curved surface shape and a depth 1102 are set, and a focus-adjusted completed image is generated.

In the example shown in FIG. 11, the face likelihood of only the object A is low, and only the object A is determined as an object of noninterest, while the objects B, C and D are determined as objects of interest. In this manner, even when complicated focus adjustment is performed, it is possible to generate interest/noninterest attribute information corresponding to the focus adjustment.

Further, in the above-described embodiment, the second image recognition unit 506 exhaustively recognizes the objects. However, as the focal distance is discretely set, some object may be missed in the recognition in accordance with setting of interval of the focal distance. In such case, the object is recognized only in the completed image, however, in this case, the object may be handled as an object of interest.

Further, in the above-described embodiment, the second image recognition unit 506 recognizes the entire object while varying the focal distance at an arbitrary interval, however, the present invention is not limited to this arrangement. For example, it may be arranged such that a pan focus image is generated by setting the focal distance to an intermediate distance so as to widen the depth, and the recognition processing is performed with respect to the image.

Further, in the above-described embodiment, the image group outputted from the image output unit 212 of the image capture apparatus 100 is stored in the external storage device 404, however, the present invention is not limited to this arrangement. Any method is applicable to acquire the image group as long as an image group where the focus adjustment processing is possible with the image processing apparatus 400 is inputted. For example, it is known that an equivalent image group is obtained with a structure having plural lenses and one sensor. The image group obtained in this manner may be used.

In the present embodiment, on the assumption that all the images captured with the image capture units 101 to 109 are color images, the constituent elements and processings of the respective units have been described. On the other hand, a part or all of the images captured with the image capture units 101 to 109 may be monochrome images. In such case, the image capture apparatus 100 has a structure where the color filter 308 in FIG. 3 is omitted.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-086800, filed Apr. 5, 2012, which is hereby incorporated by reference herein in its entirety.

What is claimed is:

1. An image processing apparatus comprising:
    an image generation unit to generate a processed image in which image capture-related parameters are adjusted, using an image group having a plurality of images captured from multiple view points;
    a first image recognition unit to recognize a particular object from the processed image generated by the image generation unit;
    a second image recognition unit to recognize respective objects which appear in the image group, based on the image group;
    a determination unit to compare a result of recognition by the first image recognition unit to the result of recognition by the second image recognition unit, and determine an object of interest and an object of noninterest in the image group; and
    an attribute generation unit to generate attribute information including a result of determination by the determination unit, in the processed image,
    wherein the image generation unit further performs focus adjustment at a predetermined distance and generates a plurality of processed images for comparison using the image group, and
    wherein the second image recognition unit recognizes all the objects from the plurality of processed images for comparison.

2. The apparatus according to claim 1, wherein the second image recognition unit calculates a highest likelihood among the plurality of processed images for comparison, by object.

3. The apparatus according to claim 1, wherein the first image recognition unit calculates likelihood by object.

4. A method of controlling an image processing apparatus, comprising:
- an image generation step of generating a processed image in which image-capture related parameters are adjusted, using an image group represented with a plurality of images captured from multiple view points;
- a first image recognition step of recognizing a particular object from the processed image generated at the image generation step;
- a second image recognition step of recognizing respective objects which appear in the image group, based on the image group;
- a determination step of comparing a result of recognition at the first image recognition step to the result of recognition at the second image recognition step, and determining an object of interest and an object of noninterest in the image group; and
- an attribute generation step of generating attribute information including the result of determination at the determination step, in the processed image,
- wherein the image generation step includes performing focus adjustment at a predetermined distance and generating a plurality of processed images for comparison using the image group, and wherein the second image recognition step includes recognizing all the objects from the plurality of processed images for comparison.

5. A non-transitory computer-readable storage medium storing computer programs which, when executed by a computer, causes the computer to perform the steps in the method according to claim 4.

6. An image processing apparatus comprising:
- an image generation unit to generate a combined image in which image-capture related parameters are adjusted, using an image group captured from multiple view points;
- a first image recognition unit to detect and recognize an object from the combined image generated by the image generation unit in accordance with a user's operation;
- a second image recognition unit to perform focus adjustment by a predetermined distance using the image group to generate a plurality of combined images for comparison, and to detect and recognize objects from the plurality of combined images for comparison;
- a determination unit to determine an object of interest and an object of noninterest in the image group based on a result of detection by the first image recognition unit; and
- an attribute generation unit to generate attribute information including a result of determination by the determination unit in the combined image,
- wherein the determination unit compares the result of detection by the first image recognition unit to a result of detection by the second image recognition unit, and determines the object of interest and the object of non-interest in the image group.

7. The image processing apparatus according to claim 6, wherein the predetermined distance is determined based on distribution of a focal distance of the image group.

8. The image processing apparatus according to claim 6, wherein the second image recognition unit generates a pan focus image with a widened depth, and detects and recognizes an object.

9. The image processing apparatus according to claim 6, wherein the second image recognition unit calculates a highest likelihood among the plurality of combined images for comparison, by object.

10. The image processing apparatus according to claim 6, wherein the attribute information is applied to at least one of the combined image or the image group.

11. A method of controlling an image processing apparatus comprising:
- an image generation step of generating a combined image in which image-capture related parameters are adjusted using an image group captured from multiple view points;
- an image recognition step of detecting and recognizing an object from the combined image generated at the image generation step in accordance with a user's operation;
- a performance step of performing focus adjustment by a predetermined distance using the image group to generate a plurality of combined images for comparison, and to detect and recognize objects from the plurality of combined images for comparison;
- a determination step of determining an object of interest and an object of noninterest in the image group based on a result of detection at the image recognition step; and
- an attribute generation step of generating attribute information including a result of determination at the determination step in the combined image,
- wherein determining the object of interest includes comparing the result of detection at the image recognition step to a result of detection at the performance step, and determining the object of interest and the object of non-interest in the image group.

12. A non-transitory computer-readable storage medium holding a program to, upon execution by a computer, cause the computer to perform the respective steps of the method in claim 11.

* * * * *